United States Patent Office 3,806,506
Patented Apr. 23, 1974

---

3,806,506
FURAN DERIVATIVES, COMPOSITIONS THEREOF AND METHODS FOR USING SAME
Ethel E. Felauer and Marshall Kulka, Guelph, Ontario, Canada, and Zaven S. Ariyan, Woodbury, Conn., assignors to Uniroyal, Inc., New York, N.Y., and Uniroyal Ltd., Montreal, Quebec, Canada
No Drawing. Filed Aug. 5, 1971, Ser. No. 169,469
Int. Cl. C07d 87/34
U.S. Cl. 260—247.7 G          2 Claims

ABSTRACT OF THE DISCLOSURE

A broad class of furan derivatives, including certain novel furoic acid carboxamides, are useful as anti-inflammatory agents.

CROSS REFERENCE TO RELATED APPLICATIONS

This application is related to the abandoned application of Felauer et al., Ser. No. 799,109, filed on Feb. 13, 1969, and the pending continuation application, Ser. No. 232,293, filed on Mar. 6, 1972, and disclosing methods for preparing many of the furan derivatives of the present invention.

This application is also related to the pending application of Davis et al., Ser. No. 799,110, filed on Feb. 13, 1969, and disclosing the fungicidal, insecticidal and nematocidal activity of many of the furan derivatives of the present invention.

BACKGROUND OF THE INVENTION

Field of the invention

The invention relates to furan derivatives including novel compounds as well as compounds heretofore known. All the compounds to which the invention is directed are useful as anti-inflammatory agents, i.e., they prevent and/or inhibit the formation of granuloma tissue in animals. Accordingly, the invention is, in one aspect thereof, a method of preventing and/or inhibiting the formation of granuloma tissue in animal subjects. In a second aspect, the invention is a class of novel compounds and pharmaceutical compositions containing same.

Description of the prior art

Furan derivatives, including numerous 3-furoic acid amides are known. However, none of the known compounds has ever been disclosed as having anti-inflammatory properties.

The application of Felauer et al. noted above discloses and claims a broad class of furoic acid amides and a method for preparing same.

According to the Felauer et al. application, an α-hydroxyketone of the formula:

$$\begin{array}{c} ACO \\ | \\ B\dot{C}HOH \end{array}$$

is reacted with an amide of the formula:

$$\begin{array}{c} CH_2CONEE_1 \\ | \\ \dot{C}OD \end{array}$$

in the presence of a Friedel-Crafts reagent (AlCl$_3$) to form a compound of the formula:

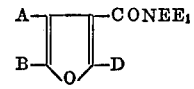

wherein A, B and D are independently selected from the group consisting of H, halo, —NH$_2$, alkyl, substituted alkyl, alkenyl, A and B together are α,ω-alkylene, phenyl, or substituted phenyl; E is selected from the group consisting of H, alkyl, acyl, aroyl and sulfenyl; and E$_1$ is selected from the group consisting of phenyl, substituted phenyl, alkyl, alkenyl, cycloalkyl and heterocyclic aryl groups.

The application of Davis et al. noted above, discloses and claims methods of using the said Felauer et al. compounds for agricultural purposes.

SUMMARY OF THE INVENTION

The invention provides a safe and effective method of preventing and inhibiting the formation of granuloma tissue in an animal subject. This is achieved by administering to an animal subject, a therapeutically effective amount of at least one compound selected from a very large group of furan derivatives, some of which are known and some of which are novel. Generally, the amount administered will be from about 0.1 to 100 mg./kg./day of body weight, preferably from about 10 to 25 mg./kg./day. In humans, the amount will be from about 0.1 to 1 mg./kg./day, preferably from about 0.25 to 0.6 mg./kg./day.

The invention further provides a new class of furan derivatives which are effective as anti-inflammatory agents, as well as pharmaceutical compositions comprising both the known and novel furan derivatives.

The known furan derivatives which are among those used in the present method are those having the formula:

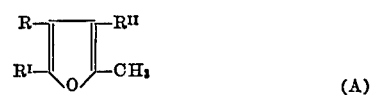

(A)

wherein R and R$^\text{I}$ are both hydrogen or methyl and R$^\text{II}$ is selected from the group consisting of:

—CONR$_1$R$_2$, —NHCOC$_6$H$_5$ and —CH$_2$NHC$_6$H$_5$ wherein R$_1$ is selected from the group consisting of hydrogen, alkyl, cyanoalkyl, phenyl, and alkylphenyl and R$_2$ is selected from the group consisting of amino, alkylamino, amido, and —CSN(alkyl)$_2$; provided that R$_1$ and R$_2$ are different from each other.

The novel furan derivatives which are among those used in the present method and which form, per se, part of the invention are those having the formulae:

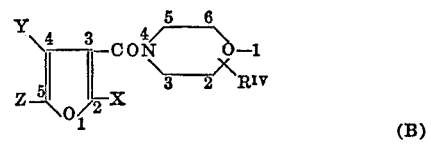

(B)

wherein X is selected from the group consisting of hydrogen and lower alkyl, Y and Z are independently selected from the group consisting of hydrogen, lower alkyl and phenyl; and $R^{IV}$ is at last one member of the group consisting of hydrogen and lower alkyl; with the proviso that X, Y, Z and $R^{IV}$ are not all simultaneously hydrogen; and Y, Z and $R^{IV}$ are not all simultaneously hydrogen with X being methyl, said two compounds being known; and

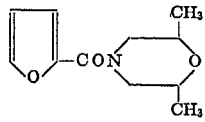
(C)

The pharmaceutical compositions according to the invention comprise, in combination, a therapeutically effective amount of at least one of the above-described furan derivatives and a pharmaceutically acceptable carrier and/or diluent therefor.

For example, in the case of a tablet, the composition will comprise, in addition to the active ingredient, fillers, binders and diluents such as lactose, methylcellulose, talc, gum tragacanth, gum acacia, agar-agar, polyvinylpyrrolidone, stearic acid and/or corn starch. In the case of a liquid suspension for oral administration, the composition will comprise, in addition to the active ingredients, a filler such as sodium carboxymethylcellulose and/or a syrup, e.g. a glycerine based syrup. In the case of a topical ointment, the composition will comprise, in addition to the active ingredient, a vehicle such as petroleum jelly or hydrophilic petrolatum.

The most preferred compound from among all those of the formula B is N-(2-methyl-3-furoyl)-2,6-dimethylmorpholine, i.e. the compound wherein Y and Z are hydrogen, X is methyl and $R^{IV}$ represents methyl groups in the 2- and 6-positions of the morpholine ring. This compound in the rat (at a dose of 200 mg./kg.) produces a reduction of 95% in carageenin induced edema.

DETAILED DESCRIPTION

The compounds of the present invention can be prepared by two different methods.

One method is the one-step reaction disclosed in considerable detail in the application of Felauer et al. which comprises reacting equimolar amounts of an α-hydroxyketone of the formula:

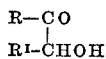

and an amide of the formula:

wherein R, $R^I$ and $R^{II}$ are as defined above to form a furan derivative of the Formula A:

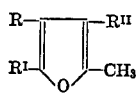

or equimolar amounts of an α-hydroxyketone of the formula:

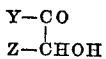

and an amide of the formula:

to form a furoic acid amide of the Formula B:

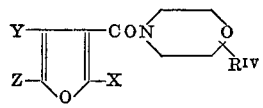

wherein X, Y, Z and $R^{IV}$ are as defined above.

The reaction is conducted in an inert solvent such as benzene, toluene or xylene in the presence of about 0.5 mole of an active Friedel-Crafts reagent such as $AlCl_3$, $AlBr_3$ or $SnCl_4$ per mole of each of the reactants.

The second method is a two-step synthesis also disclosed in the Felauer et al. application. This method comprises reacting a furoic acid derivative of the formula:

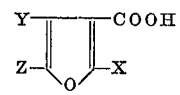

with thionyl chloride ($SOCl_2$) to form the corresponding furoyl chloride:

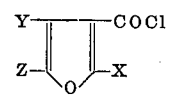

and reacting the furoyl chloride with a substituted morpholine of the formula:

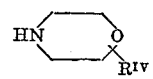

in an inert solvent such as chloroform, benzene, toluene or xylene to form the furoic acid amide of the Formula B:

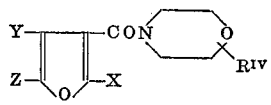

wherein X, Y, Z and $R^{IV}$ are as defined above.

In this method, the substituted morpholine may be used in a 2:1 molar excess with respect to the furoyl chloride or a 1:1 molar ratio may be used. In the latter case, the reaction is effected in the presence of one mole of a tertiary amine base such as triethylamine. In either case, the second mole of amine, i.e. the second mole of the substituted morpholine of the tertiary amine base, acts as an acceptor for the hydrogen chloride formed in the reaction between the furoyl chloride and the substituted morpholine.

The furoic acid amide of the Formula C, which is a derivative of 2-furoic acid, may be prepared by this method using 2-furoic acid in the reaction with $SOCl_2$ to form 2-furoyl chloride and then reacting same with 2,6-dimethyl morpholine.

As previously stated, the Felauer et al. application discloses and exemplifies the preparation of many of the compounds of the present invention using both of the above-described methods. For the sake of convenience and completeness however, there follows a working example showing the preparation of one of the present compounds using the first method. It will be understood of course that the method is equally applicable to all the compounds of the present invention.

EXAMPLE 1

2-methyl-4,5-diphenyl-3-carboxanilido-furan

A mixture of 0.05 mole (10.6 g.) of benzoin, 0.05 mole (8.9 g.) of acetoacetanilide and 0.025 mole (3.3 g.) of aluminum chloride was refluxed in 50 ml. of benzene with stirring for 30 minutes. The reaction was quenched with 25 ml. of water followed by 25 ml. of 6 N HCl. The benzene layer was separated, washed with water, NaOH and finally with water. The product was crystallized from methanol and had a melting point of 156–159° C.; yield 28%.

In a like manner, 2-methyl-4,5-dipropyl-3-carboxanilidofuran (M.P. 80–82° C.) was prepared using butyroin in place of the benzoin.

The following examples illustrate the second (two-step) method for preparing compounds of the Formula B. The substituted morpholines used in these examples were prepared according to the method of A. Ya Berlin and T. P. Sycheva, Zhur. Obshchei Khim. 20, 640–7 (1950) with the exception of 2,6-dimethylmorpholine, which is commercially available.

reaction mixture was then heated under reflux for one hour and the solvent and excess thionyl chloride were removed. Fresh benzene was added to the residue and the resulting solution was cooled and treated with a mixture of 0.1 mole (11 g.) 2-methylmorpholine and 0.1 mole (11 g.) triethylamine in 50 ml. benzene. The reaction mixture was washed with dilute hydrochloric acid, 5% sodium hydroxide and water. The solvent was removed and the residue was distilled, B.P. 151° C.; (2 mm.) yield 20 g. or 84%.

Other examples of the preparation of compounds of the Formula B using the above-described second method are as follows:

Compound prepared

| Example number | X | Y | Z | R$^{IV}$ | M.P.,° C. | B.P.,° C. | Percent yield |
|---|---|---|---|---|---|---|---|
| 5 | CH$_3$ | H | H | H | 103–105 | | 40 |
| 6 | CH$_3$ | H | H | 2-methyl | 66–67 | | 50 |
| 7 | CH$_3$ | H | H | 2-ethyl | | 152/2.5 mm. | 67 |
| 8 | CH$_3$ | H | H | 2-ethyl-5,5-dimethy | 63–64.5 | | 64 |
| 9 | CH$_3$ | H | H | 2,5,5-trimethyl | 55–57 | | 85 |
| 10 | CH$_3$ | H | H | 3,3-dimethyl | | 112/0.8 mm. | 63 |
| 11 | CH$_3$ | H | H | 2-ethyl-6-methyl | | 125/0.8 mm. | 77 |
| 12 | CH$_3$ | H | CH$_3$ | 2,6-dimethyl | 69–71 | | 59 |
| 13 | CH$_3$ | H | CH$_3$ | 2-methyl | | 144/1.5 mm. | 53 |
| 14 | CH$_3$ | H | CH$_3$ | 2-ethyl | | 131/1 mm. | 64 |
| 15 | CH$_3$ | H | CH$_3$ | 2-ethyl-5,5-dimethyl | | 148/2 mm. | 57 |
| 16 | CH$_3$ | H | CH$_3$ | 2,5,5-trimethyl | | 122/0.9 mm. | 50 |
| 17 | CH$_3$ | H | CH$_3$ | 3,3-dimethyl | 82–83 | 127/0.9. mm. | 53 |
| 18 | CH$_3$ | H | CH$_3$ | 2-ethyl-6-methyl | | 140/1 | 45 |
| 19 | CH$_3$ | CH$_3$ | CH$_3$ | 2,6-dimethyl | | 118/0.3 mm. | 40 |
| 20 | CH$_3$ | CH$_3$ | CH$_3$ | 2-ethyl | | 132/0.8 mm. | 60 |
| 21 | CH$_3$ | CH$_3$ | CH$_3$ | 2-ethyl-5,5-dimethyl | | 130/1 mm. | 43 |
| 22 | CH$_3$ | CH$_3$ | CH$_3$ | 2,5,5-trimethyl | | 130/1 mm. | 49 |
| 23 | CH$_3$ | CH$_3$ | CH$_3$ | 3,3-dimethyl | | 134/0.8 mm. | 50 |
| 24 | CH$_3$ | CH$_3$ | CH$_3$ | 2-ethyl-6-methyl | | 138/0.9 mm. | 68 |
| 25 | CH$_3$ | Ph | Ph | 2,6-dimethyl | 102–104 | | 65 |
| 26 | C$_3$H$_7$ | CH$_3$ | CH$_3$ | ...do... | | 128/0.3 mm. | 57 |
| 27 | H | H | H | ...do... | 44–47 | | 37 |

EXAMPLE 2

Preparation of N-(2,4,5-trimethyl-3-furoyl)morpholine

A mixture of 0.11 mole (17 g.) 2,4,5-trimethyl-3-furoic acid, 0.15 mole (18 g.) thionyl chloride and 20 ml. chloroform was stirred at room temperature overnight. The solvent and excess thionyl chloride were removed under vacuum; the residue was dissolved in about 50 ml. dry benzene, cooled and treated with 0.25 mole (22 g.) morpholine in 50 ml. benzene. After two hours at room temperature the mixture was washed with dilute hydrochloric acid, 5% sodium hydroxide and finally with water. The benzene was removed and the residue crystallized from petroleum ether (60–110°), M.P. 56–61°, yield 14 g. or 57%.

EXAMPLE 3

Preparation of N-(2-methyl-3-furoyl)-2,6-dimethylmorpholine

A mixture of 0.13 mole (16.5 g.) 2-methyl-3-furoic acid, 0.15 mole (18 g.) thionyl chloride and 40 ml. benzene was stirred at room temperature overnight. The solvent and excess thionyl chloride were removed, fresh benzene added to the residue, and the resulting solution was cooled and treated with 0.15 mole (17 g.) 2,6-dimethylmorpholine and 0.15 mole (17 ml.) triethylamine in benzene. The reaction mixture was washed with dilute hydrochloric acid, with 5% sodium hydroxide and with water. The benzene was removed and the residue crystallized from petroleum ether, M.P. 83–84°, yield 18 g. or 62%.

EXAMPLE 4

Preparation of N-(2,4,5-trimethyl-3-furoyl)-2-methylmorpholine

A mixture of 0.1 mole (15.6 g.) 2,4,5-trimethyl-3-furoic acid, 0.12 mole (13 g.) thionyl chloride and 35 ml. benzene was left at room temperature overnight. The

EXAMPLE 28

N-(2-furoyl)-2,6-dimethylmorpholine

This compound (M.P. 42° C.) was prepared in 48% yield from 2-furoic acid and 2,6-dimethylmorpholine according to the procedure of Example 2.

It should be pointed out that very many other furoic acid amides embraced by the Formulae A and B can likewise be prepared using the above-described methods and appropriately varying the starting materials.

The compounds of the present invention have pharmaceutical activity as anti-inflammatory agents, effective in the prevention and inhibition of granuloma tissue formation. This activity is demonstrated by a test which involves the diminution of experimental edema induced in the hind paw of the rat by the injection of carrageenin. This test is a standard procedure which is well known in the pharmaceutical art.

The procedure used for a measuring the inhibition of carrageenin-induced edema is a modification of the method of Winter et al., Proc. Soc. Exptl. Biol. Med. 111: 544 (1962). The device used for measurement of the paw volume is an adaptation of the water displacement procedure described by Adamkiewicz et al., Can. J. Biochem. Physiol. 33: 332 (1955). The present compounds were studied for their effectiveness in preventing the edema caused by the intraplantar injection of 0.05 ml. of a sterile 1.0% solution of carrageenin. The present compounds were administered orally one hour prior to the injection of the carageenin into the left hind paw of rats. At peak swelling time (3 hours) the volume of edema was calculated by differential paw volumes.

We have found that many of the compounds produced significant inhibition of induced edema in rats at a dose rate of 200 mg./kg.

Table I, below describes and lists compounds of the Formula A which exhibit reduction in edema in the hind paw of the rat.

TABLE I.—PERCENT REDUCTION IN EDEMA AT 200 MG./KG.

Compounds of Formula (A)

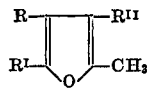

| Example number | R | $R^I$ | $R^{II}$ | Percent reduction of induced edema |
|---|---|---|---|---|
| 29 | Me | Me | —NHCOPh | 40 |
| 30 | — | — | —CON(Ph(m-Me))(CH₂CH₂CN) | 21 |
| 31 | Me | Me | —CONHN(Me)₂ | 28 |
| 32 | — | — | —CONH—Ph(o-Me) | 38 |
| 33 | — | — | —CONHPh(o-OMe) | 47 |
| 34 | — | — | —CON(Me)(Ph) | 29 |
| 35 | Me | Me | —CONH—Ph(o-Me) | 20 |
| 36 | Me | Me | —CONH—Ph(o-OMe) | 29 |
| 37 | Me | Me | —CONHNH₂ | 22 |
| 38 | — | — | —CH₂NHPh | 76 |
| 39 | — | — | —CON((CH₂)₂CN)(Ph) | 41 |
| 40 | — | — | —CON(Et)(naphthyl) | 25 |
| 41 | — | — | —CON(C₄H₉)(Ph) | 64 |
| 42 | — | — | —CON(Me)(Ph(2,6-di-Me)) | 55 |
| 43 | — | — | —CO—N(Me)(Ph(2,6-di-Et)) | 26 |
| 44 | — | — | —CO—N(C₁₂H₂₅)(Ph(o-Me)) | 29 |
| 45 | Me | Me | —CON(C₁₂H₂₅)(Ph) | 20 |
| 46 | Me | Me | —CONHPh(C₁₂H₂₅) | 29 |
| 47 | Me | Me | —CON(Me)(Ph(2,6-di-Me)) | 31 |
| 48 | Me | Me | —CO—N(CH₂CH₂CN)(Ph(o-Me)) | 22 |
| 49 | — | — | —CO—N((CH₂)₂CN)(Ph(o-Me)) | 41 |
| 50 | Me | Me | —CONHCSN(Et)₂ | 30 |
| 51 | Me | Me | —CONHCSNH₂ | 32 |
| 52 | Me | Me | —CONHPh(p-Me) | 49 |
| 53 | Me | Me | —CONHPh(m-Me) | 29 |

Note.—In Table I, Me=CH₃; Ph=C₆H₅; Et=C₂H₅; OMe=OCH₃; —=H.

Table II, below, describes and lists compounds of the Formula B which exhibit reduction in edema in the hind paw of the rat.

TABLE II.—PERCENT REDUCTION IN EDEMA AT 200 MG./KG.

Compounds of Formula (B)

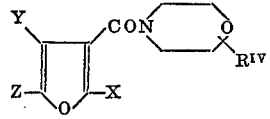

| Example number | X | Y | Z | $R^{IV}$ | Percent reduction edema 200 mg./kg. |
|---|---|---|---|---|---|
| 54 | CH₃ | H | H | H | 34 |
| 55 | CH₃ | H | H | 2,6-dimethyl | 95 |
| 56 | CH₃ | H | H | 2-methyl | 66 |
| 57 | CH₃ | H | H | 2-ethyl | 29 |
| 58 | CH₃ | H | H | 2-ethyl-5,5-dimethyl | 46 |
| 59 | CH₃ | H | H | 2,5,5-trimethyl | 45 |
| 60 | CH₃ | H | H | 3,3-dimethyl | 68 |
| 61 | CH₃ | H | H | 2-ethyl-6-methyl | 70 |
| 62 | CH₃ | H | H | 2,5,5-trimethyl | 28 |
| 63 | CH₃ | CH₃ | CH₃ | 2,6-dimethyl | 33 |
| 64 | CH₃ | CH₃ | CH₃ | 2-methyl | 39 |
| 65 | CH₃ | CH₃ | CH₃ | 2-ethyl | 21 |
| 66 | H | H | H | 2,6-dimethyl | 42 |

The compound of the Formula C exhibits a reduction of induced edema in this test of 48%.

As can be easily seen from the foregoing Tables I and II, all of the compounds of the present invention are effective in reducing induced edema by at least 20% in the rat at a dose rate of 200 mg./kg.

The compounds of Examples 29, 31, 55, 56, 58, 59, 60 and 61 (see Tables I and II) were selected for further study to determine the $ED_{50}$ in edema reduction. In this test, a group of normal rats was injected with carageenin to induce edema. Then the rats were treated with varying amounts of the above-described eight compounds, and the $ED_{50}$ was determined.

The procedure used for measuring the inhibition of carrageenin-induced edema is the above-described modification of the method of Winter et al., Proc. Soc. Exptl. Biol. Med. 111: 544 (1962). The device used for measurement of the paw volume is an adaptation of the water displacement procedure described by Adamkiewicz et al., Can. J. Biochem. Physiol. 33: 332 (1955). The above compounds were studied for their effectiveness in preventing the edema caused by the intraplantar injection of 0.05 ml. of a sterile 1.0% solution of carrageenin. Compounds were administered orally one hour prior to the injection of the carageenin into the left hind paw of rats. At peak swelling time (3 hours) the volume of edema was calculated by differential paw volumes. The $ED_{50}$ value was obtained for each compound and is defined as that dose which reduced edema formation by 25% or more compared with the mean control response (parallel run) in 50% of the animals.

The results of this test are given in Table III.

TABLE III $ED_{50}$ vs. Carageenin Assay

| Compound of Example number | Dose (mg./kg.) | $ED_{50}$, mg./kg. | Confidence limits |
|---|---|---|---|
| 29 | 10, 30, 100, 300 | 200 | |
| 31 | 10, 30, 100, 300 | 76 | (35–167) |
| 55 | 10, 30, 100, 300 | 17 | (11–27) |
| 56 | 10, 30, 100, 300 | 85 | (58.5–123.24) |
| 58 | 10, 30, 100, 300 | 123 | (89.9–168.5) |
| 59 | 10, 30, 100, 300 | 76 | (48–117.8) |
| 60 | 10, 30, 100, 300 | 142 | (96.6–208.74) |
| 61 | 10, 30, 100, 300 | 67 | (42.4–110.86) |

Of these compounds, it will be seen that those of Examples 31, 55, 59 and 61 are most effective, that is, they have the lowest $ED_{50}$.

The compounds of Examples 31 and 55 were then studied to determine the $ED_{50}$ in adrenalectomized rats using the same range of doses as in the previous test.

The method used was identical to that described above, except that the animals used were adrenalectomized several days prior to assay. Since the results in the non-adrenalectomized animals were similar to those obtained in the adrenalectomized animals, it can be inferred that the anti-inflammatory activity of the test compounds was not caused by the release of endogenous adrenocortical steroids.

The results of this test are summarized in Table IV:

TABLE IV $ED_{50}$ vs. Carageenin Assay in adrenalectomized rats

| Compound of Example number | Dose (mg./kg.) | $ED_{50}$, mg./kg. | Confidence limits |
|---|---|---|---|
| 31 | 10, 30, 100, 300 | 156 | (78–305) |
| 55 | 10, 30, 100, 300 | 27 | (13.5–62) |

From Tables III and IV it can be seen that the compound of Example 55 has a lower $ED_{50}$ than that of Example 31 in adrenalectomized rats as well as in normal rats.

The $LD_{50}$ of the compound of Example 55 in rats was found to be 500 mg./kg. Thus, the therapeutic index for this compound is 29.4, which is ($LD_{50}/ED_{50}$ in the Carageenin Assay or)

$$\left(\frac{500 \text{ mg./kg.}}{17 \text{ mg./kg.}}\right)$$

Table V gives the results of the test on the compound of Example 55 using varying doses to determine the $ED_{50}$ in local vs. systemic edema.

In the development of anti-inflammatory agents it is important to distinguish between irritants, which often demonstrate anti-inflammatory activity by a counter irritant type of effect versus true anti-inflammatory agents. The method selected for demonstrating the true local anti-inflammatory effect of the present compounds was that developed by Shanahan, R. W., Arch. int. Pharmacodyn., 175: 186, 1969. This method utilizes the carrageenin-induced paw edema and the drug is injected locally simultaneously with the irritant substance, carrageenin, into the plantar surface of the hind paw of rats. Male rats weighing between 100 and 170 grams, fasted for 18 hours prior to use were employed in this study. The test compound was added directly to the 1% carrageenin solution and injected in a volume of 0.5 ml. into the plantar tissue of the left hind paw. A group of control animals received carrageenin only. Three hours later the edema was measured. Anti-inflammatory or irritant effect was calculated as the percent increase or decrease in edema between the control group and the treated groups. Ten rats were used per group. The calculated $ED_{50}$ was based on the number of animals in each group which showed an increase or decrease of at least 25% change from the mean control value.

TABLE V

Local vs. systemic edema ($ED_{50}$ vs. carrageenin)

Compound of Example No. 55:
Dose (mg./paw) _____ 1, 2, 4, 8
$ED_{50}$ (confidence limits) _____ 1.75 mg./paw (0.62–3.67).

In the cotton pellet granuloma test, the compound of Example 55 had an $ED_{50}$ of 3 mg./kg.

In this test, the inhibition of granuloma formation was determined by a modification of the method of Meier et al., Experentia 6:469 (1950). Essentially, the test consists of subcutaneously implanting a sterile cotton disc into rats with the concomitant oral administration of the test compound twice daily for four days. Removal of the pellets along with the granuloma formation after five days was performed and the increment in dry weight was considered as the measure of granuloma formation. Based on several studies, a 40% reduction in granuloma formation is considered significant.

Thus, a dose of 3 mg./kg. is sufficient to cause a 40% reduction in granuloma formation in 50% of the test animals.

The adjuvant-induced arthritis test was also conducted in rats using the compound of Example 55. This test requires one month (from 0 to day 31). In the first seventeen days (0–17), the disease is in a developing stage, while for the remainder of the month (18–31) the disease is fully developed. The results of this test, given in terms of percent reduction of swelling in the hind paw of the rat are shown in Table VI.

The method is essentially that of Newbould, Brit. J. Pharmacol. 21: 127, 1963. The test compound was studied in the developing arthritic state and in the established arthritic state. Groups of twelve rats were administered the compound orally using methyl-cellulose as the vehicle. In the study on the developing disease, administration of the test compound begins on day 1 and on day 2 each animal is injected with a .05 ml./kg. of a 0.5% suspension of heat-killed *Mycobacterium tuberculosis* into the plantar surface of the left hind paw. Foot volumes were measured by a water displacement device on the day of administration of the mycobacterium and again on days 3, 10 and 17. The test compound was administered once daily. Body weights were recorded daily and the animals were examined for the spread of the inflammation and the degree of secondary lesions observed and scored as "mild, moderate, or severe." For study in the established disease, another group of rats are injected with the Mycobacterium and foot volumes are measured and after twenty days are again measured and administration of the test compound begins and continues for eleven days. Foot volume measurements are repeated on day 27 and day 31. The extent of the spread of the inflammation and the degree of lesions are recorded daily as are the body weights. The drug effect is measured by the percentage reduction in left hind paw volumes as compared to the hind paw volumes of the control groups.

TABLE VI.—ADJUVANT-INDUCED ARTHRITIS TEST IN RATS

Percent reduction in swelling—Hind paw

|  | Day | Compound of Example 55, 50 mg./kg. |
|---|---|---|
| Developing disease | 3 | 28 |
|  | 10 | 27 |
|  | 17 | 9 |
| Developed disease | 20 | 12 |
|  | 27 | 15 |
|  | 31 | 3 |

The compound of Example 55 [4-(2-methyl-3-furoyl)-2,6-dimethyl morpholine] was further studied for its analgesic and antipyretic effects, and also its effect on the formation of ulcers in the gastric mucosa of rats.

Analgesic activity: The test compound was studied in rats using the method of Randall and Sellito (Arch. int. pharmacodyn, 111: 409, 1957). It was studied at 50, 100, and 200 mg./kg. and compared with phenylbutazone at 100 mg./kg. At 50 mg./kg., the test compound had no analgesic activity; however, at 100 mg./kg. it was approximately equivalent to phenylbutazone. At 200 mg./kg. ten out of ten animals showed an increase in pain threshold of 100% over control values.

Antipyretic activity: The test compound was studied in rats which were fevered by the injection of a 20% yeast suspension. It was compared with the effects of antipyrene at 200 mg./kg. The test compound was inactive as an antipyretic at 50 and 100 mg./kg.; however, at 200 mg./kg. it was equivalent to antipyrene.

Effect on gastric mucosa: The test compound was studied in parallel with atropine for their effects on ulcer formation on the gastric mucosa, following whole animal restraint. At 50 mg./kg., the test compound induced no change in the control animals; however, at 100 and 200 mg./kg. there was a significant decrease in the number of ulcers and their severity.

The compounds of the present invention, either alone, or in the form of a pharmaceutical composition may be administered to an animal subject in any of a number of forms and via any of several routes. Thus, the compounds or compositions thereof may be orally administered in the form of tablets, pills or capsules. They may also be administered in the form of a parenteral suspension, as well as topically, in the form of an ointment or rectally, in the form of a suppository.

When orally administering the compounds or compositions, use can be made of a tablet, pill or capsule consisting entirely of the desired compound, although ordinarily, a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

The compounds of the present invention may also be administered rectally in the form of a suppository comprising an effective amount of the desired compound and a suitable vehicle such as petroleum jelly.

Finally, the compounds of the present invention may be applied topically in the form of an ointment, salve, cream or lotion comprising an effective amount of the desired compound and a suitable vehicle such as petroleum jelly, etc.

The following examples are specific formulations of compositions according to the invention.

EXAMPLE 67

Tablets may be prepared by the compression of a wet granulation containing the following:

Ingredients: In each
    Compound of Example 55 _____mg__ 10
    Polyvinylpyrrolidone _____mg__ 6
    Lactose _____mg__ 25
    Alcohol, 3A, 200 proof _____ml__ 1
    Stearic acid _____mg__ 3
    Talc _____mg__ 4
    Corn starch _____mg__ 15

Dosage: 1 tablet 3 times a day.

EXAMPLE 68

A liquid suspension may be prepared in the following formulation:

Ingredients: In each 5 cc., mg.
    Compound of Example 55 _____ 10
    Sodium carboxymethylcellulose _____ 5
    Syrup USP q.s. to 5 cc.

Dosage: 1 teaspoonful (5 cc.) every 3 to 4 hours.

EXAMPLE 69

Dry filled capsules (DFC) consisting of two sections of hard gelatin may be prepared from the following formulation:

Ingredients: In each, mg.
    Compound of Example 55 _____ 10
    Lactose USP, q.s.

Hard gelatin capsule size 0—Eli Lilly or equivalent. Dosage: 1 capsule three times a day.

EXAMPLE 70

An ointment for topical use may be prepared using the following formulation:

Ingredients: In each, gm.
    Compound of Example 55 _____ 5
    Hydrophilic petrolatum USP, q.s. _____ 100

Dosage: To be applied to inflamed skin areas as needed.

Having thus described our invention, what we desire to claim and protect by Letters Patent is:

1. A compound of the formula:

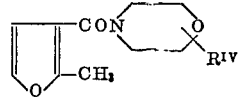

wherein $R^{IV}$ is 2-methyl, 2,6-dimethyl, 3,3-dimethyl, 2,5,5-trimethyl, 2-ethyl-6-methyl or 2-ethyl-5,5-dimethyl.

2. N-(2-methyl-3-furoyl)-2,6-dimethylmorpholine.

References Cited

FOREIGN PATENTS 124,237    9/1967    Czechoslovakia.

DONALD G. DAUS, Primary Examiner

J. TOVAR, Assistant Examiner

U.S. Cl. X.R.

260—347.3, 347.2, 347.7; 424—248